United States Patent

Usuki

[11] Patent Number: 6,120,836
[45] Date of Patent: *Sep. 19, 2000

[54] PROCESS OF PRODUCING A MAGNETIC RECORDING MEDIUM

[75] Inventor: Kazuyuki Usuki, Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/825,771

[22] Filed: Apr. 2, 1997

Related U.S. Application Data

[63] Continuation of application No. 08/571,723, Dec. 13, 1995, abandoned.

[30] Foreign Application Priority Data

Dec. 28, 1994 [JP] Japan .................................. 6-337533
Mar. 3, 1995 [JP] Japan .................................. 7-044520

[51] Int. Cl.[7] .............................................. B05D 5/12
[52] U.S. Cl. ........................ 427/131; 427/130; 427/132
[58] Field of Search .................................. 427/131, 132, 427/130, 129

[56] References Cited

U.S. PATENT DOCUMENTS 5,139,849  8/1992  Takagi et al. ..................... 427/131 X
5,294,312  3/1994  Chin ................................. 427/131 X

FOREIGN PATENT DOCUMENTS 59-207422  11/1984  Japan ............................. G11B 5/64

OTHER PUBLICATIONS

Ceramics Society of Japan, 1991–*nenkai Koenyoko–shu* (Ann. Meeting, 1991, Preprints of Papers), p. 95(Coating of Sol–Gel Derived Films on Polyimide and Its Effect on Water Permeability. N. Tohge O.H. Sakatani, T. Minaami (U. Osaka Pref.) (No Month Avail.).

*Primary Examiner*—Bernard Pianalto
*Attorney, Agent, or Firm*—Sughrue, Mion, Zinn, Macpeak & Seas, PLLC

[57] ABSTRACT

A magnetic recording medium is disclosed, comprising a nonmagnetic support having a magnetic layer comprising a ferromagnetic metal thin film formed on at least one side surface of the nonmagnetic support, and an undercoating layer, wherein the undercoating layer is formed between the nonmagnetic support and the magnetic layer; and the undercoating layer comprises a silica film or metal oxide film comprising heat-resistant fine particles. A process for producing the magnetic recording medium is also disclosed.

31 Claims, 1 Drawing Sheet

PROCESS OF PRODUCING A MAGNETIC RECORDING MEDIUM

This is a Continuation of application Ser. No. 08/571,723 filed Dec. 13, 1995 abandoned.

FIELD OF THE INVENTION

The present invention relates to a magnetic recording medium having a ferromagnetic-metal thin film as a magnetic layer. The present invention also relates to a process for producing the magnetic recording medium with a metal thin film having excellent electromagnetic characteristics by forming an undercoating layer having high heat resistance, excellent surface smoothness, and high tensile strength.

BACKGROUND OF THE INVENTION

Magnetic recording media having as a magnetic layer a ferromagnetic-metal thin film suitable for high-density recording have been practically used as magnetic tapes, hard disks, etc. Since such the magnetic recording media having a ferromagnetic-metal thin film as a magnetic layer can easily attain a high magnetic energy and simultaneously have exceedingly high surface smoothness, they have an advantage of having a reduced spacing loss and high electromagnetic characteristics.

However, too high a degree of surface smoothness not only results in an increase in real contact area but leads to adsorption of the lubricant present on the magnetic-layer surface onto a mating member, making it very difficult to ensure running durability. Because of this, the running durability of those conventional recording media is ensured at a slight sacrifice of electromagnetic characteristics by forming adequate surface roughness on the substrate, which roughness formation is accomplished by coating on the base film surface a coating solution comprising fine particles and a binder in the case of magnetic tapes, or by mechanically grinding the substrate in the case of hard disks.

In JP-A-57-8921 (the term "JP-A" as used herein means an "unexamined published Japanese patent application") is disclosed a magnetic recording medium produced by forming an $SiO_2$ or glass film by sputtering on a substrate coated with a metal or oxide film and then forming a magnetic oxide film on the $SiO_2$ or glass film by sputtering, in which the obtained recording medium has an improved magnetic characteristics. In JP-A-57-52646 is disclosed a magnetic recording medium produced by forming an SiO film by vapor deposition directly on a polymer molding as a substrate and forming at least a magnetic metal film on the SiO layer, in which the obtained recording medium has an improved life. Further, JP-A-59-207422 discloses a magnetic recording medium produced by forming on a film substrate an undercoating layer having a thickness of 0.2 μm or larger and containing fine inorganic particles with an average particle diameter of from 3 to 50 nm and then forming a thin ferromagnetic-metal film thereon, in which the obtained recording medium has an improved mechanical tape strength.

The surface roughness ideal for the attainment of both a high degree of electromagnetic characteristics and a high degree of running durability is one in which projections having almost the same height are densely present on the medium surface.

In recent magnetic recording media, however, the height of such the projections tends to become smaller gradually because higher electromagnetic characteristics have come to be required due to the strong desire for high-density recording. In such the magnetic recording media, low projections having a height of about 10 to 20 nm should be evenly formed, but the formation of such projections is difficult.

In the case of magnetic tapes, for example, the fine particles to be applied to the surface of a nonmagnetic support are required to be ultrafine particles having a particle diameter of about 10 nm as described above. Even though such the ultrafine particles can be produced as a monodisperse system, it is extremely difficult to apply the ultrafine particles to a nonmagnetic support without causing aggregation of the ultrafine particles, which have a high surface energy. Even if this aggregation occurs locally, the resulting aggregates are mostly present at a density sufficient to form undesirable spaces between a head and the magnetic recording medium. Thus, the use of ultrafine particles only gives recording media having electromagnetic characteristics lower than those expected from the diameter of the particles applied.

On the other hand, in hard disks also, it is difficult to evenly form low projections as described above by a mechanical means.

Under these circumstances, the present inventors made investigations in which fine particles having a particle size of about 20 to 30 nm, which is the ordinary size at present, were used to form on the surface of a nonmagnetic support an undercoating layer having an increased thickness so as to lessen the influence of particle size as much as possible.

However, the undercoating layer having an increased thickness has a problem that the so-called "thermal damage phenomenon" occurs in which the magnetic layer being formed by sputtering or vapor deposition develops large projections probably because the binder contained in the undercoating layer changes during the formation of the magnetic layer.

SUMMARY OF THE INVENTION

An object of the present invention is to provide a magnetic recording medium which has both of excellent electromagnetic characteristics and excellent running durability by forming uniform low projections on the surface of a nonmagnetic support.

The above object of the present invention is accomplished with (i) a magnetic recording medium comprising a nonmagnetic support having a magnetic layer comprising a ferromagnetic metal thin film formed on at least one side surface of the nonmagnetic support, and an undercoating layer, wherein the undercoating layer is formed between the nonmagnetic support and the magnetic layer, and the undercoating layer comprises a silica film or metal oxide film comprising heat-resistant fine particles;

(ii) a process for producing a magnetic recording medium comprising a nonmagnetic support having a magnetic layer comprising a ferromagnetic metal thin film on at least one side surface of said nonmagnetic support, and an undercoating layer, which comprises:

coating as an undercoating layer on at least one side surface of said nonmagnetic support a coating solution comprising a silicon-coating compound or metal oxide-containing compound and a heat-resistant fine particle; and then forming a ferromagnetic metal thin film on the undercoating layer with a vacuum film-forming method (i.e., a vacuum deposition method).

The present invention is characterized in that the magnetic recording medium has as an undercoating layer a silica or metal oxide film containing heat-resistant fine particles. This undercoating layer produces effects that it can have uniform fine projections on the surface thereof to improve the surface properties of the magnetic layer, and that since the undercoating layer is a heat-resistant silica or metal oxide film, it does not undergo thermal damage or other changes, whereby the surface properties are further improved.

Namely, in the magnetic recording medium of the present invention, since the undercoating layer comprising a silica or metal oxide film containing heat-resistant fine particles has excellent heat resistance, the surface properties of the undercoating layer formed are maintained even after the formation of the thin ferromagnetic-metal film. As a result, a magnetic recording medium having extremely uniform low projections can be obtained.

DETAILED DESCRIPTION OF THE INVENTION

The term "silica film" employed herein for describing the magnetic recording medium of the present invention is used in a broad sense, and means a film made of a compound constituted of a network made up mainly of silicon-oxygen bonds. However, the compound need not have the stoichiometric ratio represented by $SiO_2$, and the silica film may contain, e.g., hydroxyl, alkoxy, or alkyl groups. Although methods for producing such a silica film are not particularly limited, it is preferred to form the film by applying the sol-gel method which will be described later. Such a silica film can be formed easily and have an excellent heat resistance as compared with ordinary resins such as polyester resins. Due to its excellent heat resistance, this silica film, even when the nonmagnetic support is heated during the formation of a ferromagnetic-metal thin film by vacuum deposition or sputtering, undergoes neither thermal damage nor surface deterioration caused by oligomer migration and can retain the almost intact surface properties of the undercoating layer. The silica film is also characterized as being less apt to suffer blocking even when the surface thereof is smooth. Consequently, when used in a medium having especially a polymer film as a nonmagnetic support, the silica film is little influenced by the back surface of the nonmagnetic support and can retain the initial surface properties thereof even when stored in a rolled state.

Bringing the composition of the silica film in this invention close to the stoichiometric ratio represented by $SiO_2$ leads to an increase in the hardness of the film and a decrease in the elasticity thereof. A decrease in elasticity may result in cracking during operations at undercoating layer formation (e.g., drying and heating), or during subsequent handling. Care should be taken to avoid such cracking especially when the nonmagnetic support is a polymer film. It is known that this cracking problem can be eliminated by replacing a part of the $SiO_2$ bonds with Si—R bonds (R is an alkyl group) [see, e.g., Ceramics Society of Japan, 1991-*nenkai Kōenyokō-shu* (Ann. Meeting, 1991, Preprints of Papers), p. 95]. This alkyl group is not particularly limited, and examples thereof include methyl, ethyl, and propyl. It is however preferred that the alkyl group have 8 carbon atoms or less from the standpoint of diminishing the change of film thickness upon the decomposition of the Si—R bonds. Although the number of alkyl groups bonded to one Si atom may be 1 or 2, it is preferably 1 from the standpoint of diminishing the change of film thickness upon decomposition. The proportion of alkyl-bonded Si atoms in the silica film is not particularly limited. It is however preferred that from 20 to 80 atom % of all Si atoms be alkyl-bonded Si atoms from the standpoint of forming a homogeneous and crack-free undercoating layer.

Also, the silica film may comprise a composite oxide comprising silicon oxide and metal oxide described below.

The term "metal oxide film" employed herein for describing the magnetic recording medium of the present invention is used in a broad sense, and means a film made of a compound consisting of a network made up mainly of metal-oxygen bonds. However, the proportion of the metal to oxygen contained therein need not be the stoichiometric ratio. For example, the metal oxide film may contain hydroxyl, alkoxy or alkyl groups, or other organic ingredients. Although methods for producing such a metal oxide film are not particularly limited, it is preferred to form the film by applying the sol-gel method which will be described later. Such a metal oxide film can be formed easily and have an excellent heat resistance as compared with ordinary resins such as polyester resins. Due to its excellent heat resistance, this metal oxide film, even when the nonmagnetic support is heated during the formation of a ferromagnetic-metal thin film by vacuum deposition or sputtering, undergoes neither thermal yielding nor surface deterioration caused by oligomer migration and can retain the almost intact surface properties of the undercoating layer. The metal oxide film is also characterized as being less apt to suffer blocking even when the surface thereof is smooth. Consequently, when used in a medium having especially a polymer film as a nonmagnetic support, the metal oxide film is little influenced by the back surface of the nonmagnetic support and can retain the initial surface properties thereof even when stored in a rolled state.

The metal oxide in the present invention is not particularly limited, and examples thereof include iron oxide, niobium oxide, titania, alumina, and zirconia. Preferred of these are titania, alumina, and zirconia. Also usable are composite oxides of these oxides, e.g., barium titanate and lead titanate zirconate, and composite oxides obtained by adding silica to these oxides.

Bringing the composition of the metal oxide film in the present invention close to the stoichiometric ratio leads to an increase in the hardness of the film and a decrease in the elasticity thereof. A decrease in elasticity may result in cracking during operations at undercoating layer formation (e.g., drying and heating), or during subsequent handling. Care should be taken to avoid such cracking especially when the nonmagnetic support is a polymer film.

Any organic or inorganic material may be used, without particular limitations, as the material of the heat-resistant fine particles for use in the undercoating layer in the present invention, as long as the material used has heat resistance. Examples of usable organic materials include aromatic polyamides, polyimides, polysulfones, and poly(phenylene oxide)s. Examples of usable inorganic materials include silica, alumina, titania, and carbon.

These heat-resistant fine particles are preferably spherical particles having the same (i.e., monodispersed particles) or almost the same size. It is especially preferred that the surface of the particles has undergone a treatment for imparting good dispersibility into solvents.

The average particle diameter of the heat-resistant fine particles is preferably from 15 to 100 nm, more preferably from 20 to 50 nm. If the average particle diameter thereof is smaller than the lower limit, the particles have too high a surface energy and application of a coating solution containing such particles to a nonmagnetic support is apt to give a dry coating film containing aggregates of the particles which aggregates each consists of several primary particles; the formation of these aggregates leads to impaired surface properties. On the other hand, average particle diameters thereof larger than the upper limit result in the necessity of increasing the thickness of the silica or metal oxide film which will be described later; in this case, it is difficult to form a defect-free continuous film having an even thickness.

Figure 1:
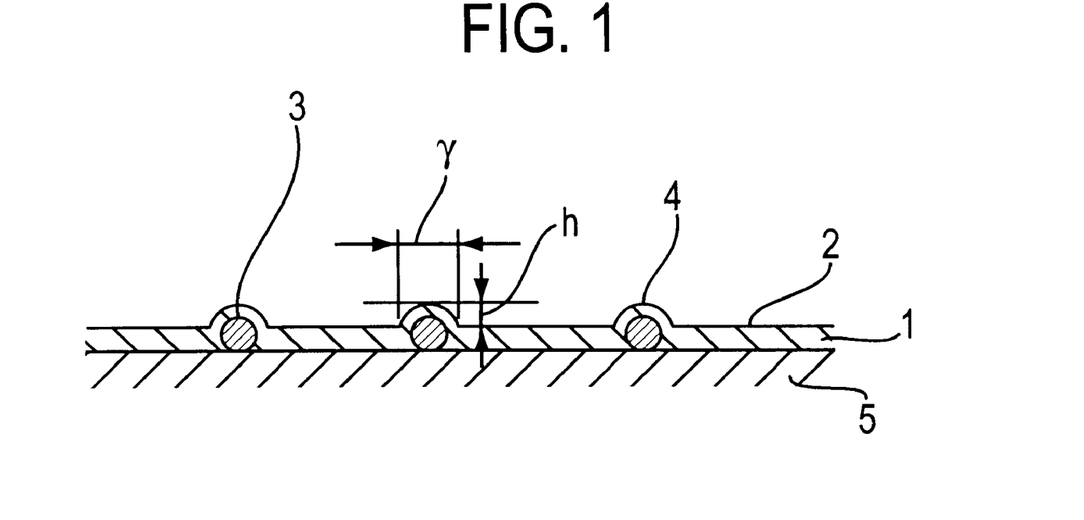
FIG. 1 is a diagrammatic view of a longitudinal section of a nonmagnetic support having an undercoating layer.

In the present invention, the average particle diameter of the heat-resistant fine particles, a (nm), and the thickness of the silica or metal oxide film, d (nm), are desirably such that 15 nm$\leq$a$\leq$100 nm and 0$\leq$(a−d)$\leq$20 nm. Especially preferably, (a−d) is about 10 nm. The reasons for the above are that the heat-resistant fine particles having a particle diameter of about from 15 to 100 nm have good dispersibility as stated above, and that the above-specified range of (a−d) is advantageous in forming very low uniform projections using these fine particles. The relatively large thickness of the silica or metal oxide film also has the effect of burying not only the projections originally present on the nonmagnetic support but also any foreign matter present thereon to thereby diminish the influence of the surface properties of the nonmagnetic support. As illustrated in FIG. 1, the height of a projection 4 formed on an undercoating layer 1 means the distance h between the reference plane 2 of the undercoating layer 1 and the top of the projection 4, which is attributable to a heat-resistant fine particle 3. FIG. 1 diagrammatically shows a longitudinal section of a nonmagnetic support 5 covered with the undercoating layer 1. Although the diameter r of the projection depends on the average particle diameter of the heat-resistant fine particles and on the thickness of the undercoating layer and the thickness of the undercoating resin film adherent to the heat-resistant fine particle, it is usually from 5 to 100 nm, preferably from 10 to 30 nm.

In the case where the undercoating layer in the present invention is a silica film, this undercoating layer can be formed by preparing a coating solution comprising a solution of a silicon(-containing) compound and the above-described heat-resistant fine particles contained in the solution, and applying this coating solution on at least one side surface of a nonmagnetic support. The silicon (-containing) compound may be a polymer, but is preferably a monomer which undergoes hydrolytic polymerization. This polymerizable monomer is used, for example, by a sol-gel method.

Examples of the monomer include alkoxysilanes, alkylalkoxysilanes, silicon chloride, silazanes, and alkylated silicon chlorides. Preferred of these are tetraalkoxysilanes and alkyltrialkoxysilanes.

In the sol-gel method, the polymerizable compound is dissolved in a solvent together with an acid and water for regulating the rates of polymerization and hydrolysis. Heat-resistant fine particles are added thereto, and the resulting coating solution is applied to a nonmagnetic support and dried. The coating is heated if necessary. Thus, an undercoating layer is formed. Although an inorganic salt, e.g., silicon chloride, is also usable as a raw material, such the inorganic salt is not so desirable in that when the heat treatment of the coating is performed insufficiently, corrosion resistance may be adversely influenced.

When an appropriate proportion of a tetraalkoxysilane is replaced with a monoalkyltrialkoxysilane or a dialkyl-dialkoxysilane to incorporate Si—R bonds, flexibility can be imparted to the resulting film to prevent cracking, as stated hereinabove. In this case, it is desirable that from 20 to 80 mol %, preferably from 20 to 60 mol %, of the tetraalkoxysilane be replaced with the alkylated alkoxysilane.

Examples of alkoxysilanes that can be used in the present invention include tetramethoxysilane, tetraethoxysilane, tetra-n-propoxysilane, and tetraisopropoxysilane. The number of carbon atoms contained in each alkoxy group is preferably 5 or smaller from the standpoint of easiness of hydrolysis.

Examples of the compound having one or more Si—R bonds include methyltriethoxysilane, ethyltriethoxysialne, n-propyltriethoxysilane, dimethyldiethoxysilane, and diethyldiethoxysilane. The number of carbon atoms contained in each alkyl group is preferably 8 or smaller, and the number of alkyl groups per molecule is preferably 1 or 2.

Examples of the acid include hydrochloric acid, nitric acid, and acetic acid. The acid is added in an amount of usually from 0.1 to 20 mol %, preferably from 1 to 10 mol %, based on the amount of the alkoxide. Water is added in an amount of usually from 100 to 800 mol %, preferably from 100 to 400 mol %, based on the amount of the alkoxide. If hydrochloric acid and water are added in too large amounts, some kinds of heat-resistant fine particles may aggregate. For avoiding such aggregation, the amounts of the acid and water should be reduced to the respective lower limits at which a homogeneous film can be formed, or an appropriate solvent should be selected. In an alternative method for avoiding aggregation, a coating operation for fixing the fine particles to a nonmagnetic support is conducted first, followed by a coating operation for forming a silica film to regulate the height of the projections attributable to the fine particles. In this method, the amount of the silicon compound contained in the coating film formed by the first coating operation is desirably regulated to from 1/20 to 1/5 of that in the coating film formed by the second coating operation.

The projections formed on the undercoating layer surface in the magnetic recording medium of the present invention, which are constituted mainly of particles, are present at a density of generally from $0.5\times10^6$ to $100\times10^6$ projections per mm$^2$, desirably from $1.0\times10^6$ to $70\times10^6$ projections per mm$^2$. Too high densities of the projections result in increased noise, while too low densities thereof result in reduced running durability.

In the case where the undercoating layer in the present invention is a metal oxide film, this undercoating layer can be formed by applying a sol-gel method. Specifically, the undercoating layer can be formed by preparing a coating solution comprising a solution of a metal compound and the above-described heat-resistant fine particles contained in the solution, applying this coating solution on at least one side surface of a nonmagnetic support, and drying the coating, if necessary followed by burning.

The sol-gel method is a film-forming technique in which a coating solution containing a metal(-containing) compound, an acid or base for regulating the rates of polymerization and hydrolysis, a stabilizer, water, etc. is applied and the coating is burned. In the present invention, heat-resistant fine particles are dispersed into such a coating solution and this coating solution is applied to a nonmagnetic support and dried. Burning is performed if necessary.

Examples of the metal(-containing) compound for use as a raw material include metal alkoxides, metal chlorides, oxychlorides, metal salts of acids, e.g., nitric acid salts, and metal complexes, e.g., acetylacetonato complexes. Of these compounds, metal alkoxides are especially preferred in that the object of the present invention can be sufficiently accomplished even when the coating containing a metal alkoxide is burned at a low temperature.

In the case where an ordinary metal alkoxide other than silicon alkoxides is used as a raw material, it is difficult to form a homogeneous thin film by the mere application of a coating solution containing the metal alkoxide dissolved therein, since the rate of the hydrolysis of the alkoxide is higher than polymerization rate. It is known that in the case of thin-film formation from such a metal alkoxide, addition of a stabilizer, e.g., acetylacetonate, for regulating the hydrolysis of the metal alkoxide is effective in forming a homogeneous thin film (see, for example, *Journal of the Ceramic Society of Japan*, Vol. 100, pp. 1122–1126 (1992)). In the present invention also, use of such a stabilizer in combination with a metal alkoxide enables the formation of a homogeneous undercoating layer.

Examples of the metal alkoxide for use in this invention include methoxides, ethoxides, n-propoxides, isopropoxides, and n-butoxides of metals. The number of carbon atoms contained in the alkoxy group is preferably 5 or smaller from the standpoint of facilitating hydrolysis, and is preferably 2 or larger from the standpoint of inhibiting hydrolysis in the air.

Examples of the stabilizer include β-diketones such as acetylacetone and ethylacetonate, alkanolamines such as monoethanolamine, organic acids such as acetic acid, and thiols such as propanethiol.

The addition amount of the stabilizer is in the range of from 1:1 in terms of stabilizer/metal alkoxide molar ratio to the stoichiometric amount in which the alkoxy groups are completely replaced. For example, in the case of adding acetylacetone to tetrapropoxyzirconium, the amount of the acetylacetone is from 1 to 4 mol per mol of the tetrapropoxyzirconium.

Examples of solvents that can be used in the present invention include organic solvents such as methanol, ethanol, isopropyl alcohol, methyl ethyl ketone, and cyclohexanone. Care should be taken in selecting solvents because the dispersibility of heat-resistant fine particles varies depending on the kinds of such solvents.

For forming the undercoating layer on a nonmagnetic support in this invention, a solution prepared by dissolving the above-described ingredients in an organic solvent is applied to the nonmagnetic support by a coating technique such as, e.g., wire-bar coating, gravure coating, spray coating, dip coating, or spin coating, and is then dried.

In the present invention, the undercoating layer is coated and then is sufficiently dried to remove volatile ingredients.

In this state of the undercoating layer obtained, the mechanical strength of the undercoating layer is not so high. However, this undercoating layer as it is can sufficiently perform its functions. In order to completely remove the volatile ingredients remaining in the undercoating layer or to complete the formation of the silica film, heat treatment may be performed at a temperature of desirably 500° C. or lower so as to maintain the flexibility of the undercoating layer, particularly preferably from 150 to 300° C.

In the present invention, depending on combination of materials, there are cases where heat-resistant fine particles aggregate due to the influence of the water added for hydrolysis. This aggregation of heat-resistant fine particles can be prevented by a method in which heat-resistant fine particles are first fixed on a substrate surface using a coating solution containing the lowest possible amount of water, and then a solution containing a silicon(-containing) compound or a metal(-containing) compound and water and not containing heat-resistant fine particles is then applied to regulate the thickness of the undercoating layer to thereby control the height of projections. An undercoating film having such a two-layer structure is a preferred embodiment in the present invention.

Figure 2:
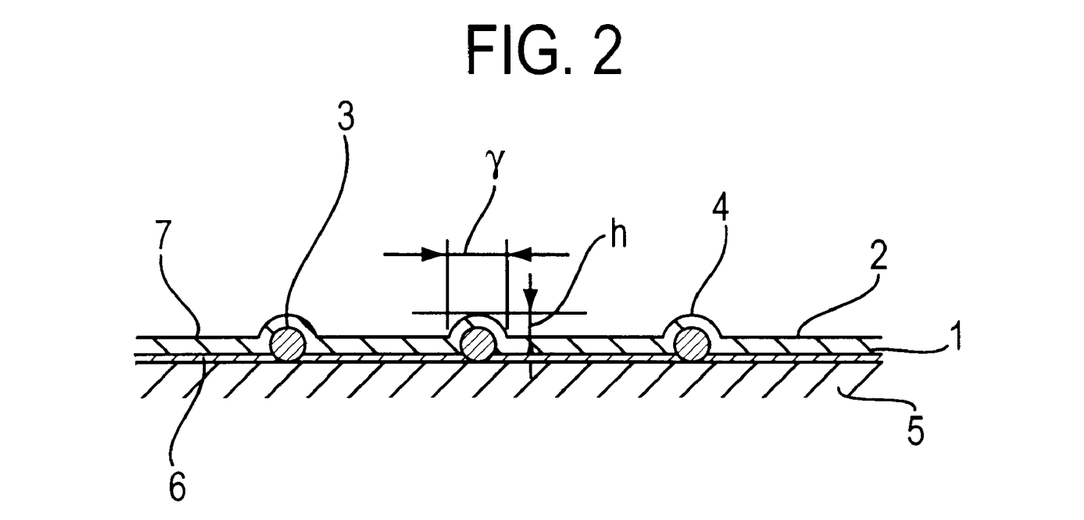
FIG. 2 is a diagrammatic view of a longitudinal section of a nonmagnetic support having an undercoating layer with a two-layer structure.

In this case, the silica or metal oxide film shown as the undercoating layer 1 in FIG. 1 comprises a lower film 6 for fixing heat-resistant fine particles to a substrate surface and an upper film 7 mainly for regulating both the thickness of the undercoating layer and the height h of projections, as illustrated in FIG. 2. The thickness of the lower film, i.e., the distance between the nonmagnetic-support surface and the interface between the upper and the lower films, is usually from 2 to 50 nm, preferably from 5 to 20 nm. The thickness of the upper film, i.g., the distance between the reference plane 2 and the interface between the upper and the lower films, is usually from 5 to 100 nm, preferably from 10 to 50 nm.

Various known techniques are applicable to the method for fixing heat-resistant fine particles to a nonmagnetic support in this invention by applying a first coating solution to the nonmagnetic support and drying the resulting coating layer (referred to also as "first coating layer"). In this case, the degree of drying of the first coating layer can be selected in a wide range. The temperature for the drying of the first coating layer is usually from 20 to 200° C., preferably from 50 to 150° C. The first coating layer thus dried may be subjected to heat treatment, before a second coating solution is applied thereto. The heat treatment and the drying treatment may be performed simultaneously as a single operation.

In the case where a second coating solution is applied to the first coating layer in the present invention and the resulting coating layer (referred to also as "second coating layer") is dried together with the first coating layer, the drying temperature is usually from 20 to 200° C., preferably from 50 to 150° C. After the drying treatment, the second coating layer and the first coating layer may be subjected to heat treatment.

In the case where an undercoating layer in this invention is formed through one coating step without conducting plural coating steps as described above, conditions for the drying treatment and heat treatment are selected as described above.

In the present invention, although the undercoating layer which has undergone a drying treatment alone is inferior in mechanical strength, this undercoating layer as it is can sufficiently perform its functions. Heat treatment is effective in completely removing the volatile ingredients remaining in the undercoating layer or in completing the formation of the silica or metal oxide film. This heat treatment is performed at a temperature of desirably 700° C. or lower so as to maintain the flexibility of the undercoating layer, particularly preferably from 200 to 500° C.

The nonmagnetic support used in the present invention may be a polymer film in the case of a flexible medium, or may be a glass or aluminum substrate in the case of a rigid medium. In the case of a flexible medium, preferred examples of the support include 3 to 75 μm-thick films of, e.g., poly(ethylene terephthalate), poly(ethylene naphthalate), polyimides, polyamides, poly(amide-imide)s, and poly(phenylene sulfide). Also usable is a base containing a filler so as to have a rough surface.

For forming a thin ferromagnetic-metal film as the magnetic layer in the magnetic recording medium of the present invention, a conventionally known vacuum deposition film-forming technique may be used such as vapor deposition or sputtering. However, the present invention is especially suitable for the production of floppy disks using sputtering, and is free from the problem of thermal damage.

In the case where a magnetic layer is formed by a vapor deposition process of the continuous winding type capable of high-speed film formation, the magnetic layer may have the composition of a conventionally known metal or alloy consisting mainly of cobalt. For example, vapor deposition is conducted in an oxygen atmosphere to form a magnetic layer comprising Co, Co—Ni, Co—Fe, or the like and containing oxygen therein. From the standpoint of improving electromagnetic characteristics in particular, the magnetic layer is desirably constituted of a material, such as Co—O or Co—Fe containing Co—O, in which preferably at least 90%, more preferably at least 95%, of the metal atoms are cobalt. The thickness of the magnetic layer is desirably from 100 to 300 nm, particularly preferably from 120 to 200 nm.

In the case of oblique-incidence vapor deposition, the travelling speed is usually 20 m/min or higher, preferably from 50 to 200 m/min.

The degree of vacuum in the deposition chamber in oblique-incidence vapor deposition is usually $5 \times 10^{-5}$ Torr or lower, preferably $1 \times 10^{-6}$ Torr or lower. Means for heating a ferromagnetic metal are not particularly limited, and examples thereof include electron beams and induction heating.

The presence of oxygen gas during vapor deposition is necessary for enhancing the coercive force ($H_c$) of the magnetic layer. The amount of oxygen is regulated so as to result in a coercive force of preferably from 1,200 to 2,000 Oe and in an oxygen content in the magnetic layer of preferably from 10 to 30%, more preferably from 15 to 25%. The amount of oxygen introduced during vapor deposition depends on the width of vapor deposition and the speed of travelling. For example, in the case where a magnetic layer having an $H_c$ of 1,600 Oe is to be formed at a rate of 20 m/min on a nonmagnetic support having a width of 100 mm, oxygen is introduced at a rate of 250 ml/min at an angle close to the minimum angel of incidence. In this case, the partial oxygen pressure is usually from $1 \times 10^{-5}$ to $5 \times 10^{-4}$ Torr.

In the case where a magnetic layer is formed by sputtering, the magnetic layer may have the composition of a conventionally known metal or alloy consisting mainly of cobalt. Examples of usable materials include Co—Cr, Co—Ni—Cr, Co—Cr—Ta, Co—Cr—Pt, Co—Cr—Ta—Pt, Co—Cr—Pt—Si, and Co—Cr—Pt—B. From the standpoint of improving electromagnetic characteristics in particular, Co—Cr—Ta and Co—Cr—Pt are preferred. The thickness of the magnetic layer is desirably from 10 to 300 nm.

For the purpose of improving electromagnetic characteristics, the ferromagnetic-metal thin film may be made to have a multilayer construction or may be formed on a subbing layer (i.e., a primer coating layer) or interlayer.

The subbing layer may be formed by an ordinary vacuum deposition film-forming technique, e.g., vapor deposition, ion plating, or sputtering. Especially preferred of these are sputtering. The subbing layer is constituted of a nonmagnetic metal, which is not particularly limited in kind. Examples of the metal include Pt, Au, Ti, Ta, W, Al, Cr, V, Cu, Ag, and Au. These metals may be used alone or in combination. In the case of the vapor deposition thin film type magnetic layer, preferred are nonmagnetic metals consisting mainly of Cu, and in the case of the sputtering type magnetic layer, preferred are nonmagnetic metals consisting mainly of Cr.

The thickness of the subbing layer is usually from 50 to 500 Å, preferably from 100 to 300 Å. This subbing layer need not be evenly formed over the whole surface of the nonmagnetic support, and may be deposited intermittently or in the form of dots.

It is preferred to conduct the formation of a magnetic layer subsequently to the formation of the subbing layer while keeping the primed substrate in a vacuum. This method brings about higher effects.

The magnetic recording medium of the present invention may have a protective layer on the thin ferromagnetic-metal film. This protective film serves to improve running durability and corrosion resistance.

Examples of the material of this protective layer include oxides such as silica, alumina, titania, zirconia, cobalt oxide, and nickel oxide, nitrides such as titanium nitride, silicon nitride, and boron nitride, carbides such as silicon carbide, chromium carbide, and boron carbide, and carbons such as graphite and amorphous carbon.

The protective layer is preferably a hard film having a hardness not lower than that of a head material. The most desirable is a protective layer which is less apt to suffer seizing during sliding and is capable of stably retaining this effect. Examples of such a protective layer is a hard-carbon film.

The carbonaceous protective film is a carbon film formed by, e.g., plasma-assisted CVD or sputtering and consisting of amorphous, graphitic, or diamond-structure carbon or of a mixture of two or more thereof. Especially preferred is a hard carbon film which is a film of the carbon generally called diamond-like carbon. This hard carbon film has a Vickers hardness of generally 1,000 kg/mm$^2$ or higher, preferably 2,000 kg/mm$^2$ or higher. The carbon constituting this film has an amorphous structure and is electrically non-conductive.

Although the protective film of diamond-like carbon can be formed by either sputtering or CVD, it is preferred to produce the film by CVD from the standpoints that CVD is superior in production efficiency and stability of product quality, and that satisfactory abrasion resistance can be ensured even when the film formed by CVD is an ultrathin film with a thickness of 10 nm or smaller. In an especially preferred CVD process, chemical substances decomposed by a high-frequency plasma are accelerated by applying a bias voltage to the substrate.

The carbon compound to be used as a material for the carbonaceous protective film and converted to a plasma is not particularly limited. Examples thereof include hydrocarbons, ketones, and alcohols. Especially preferred carbon compounds include alkanes such as methane, ethane, propane, and butane, alkenes such as ethylene and propylene, and alkynes such as acetylene.

These film-forming substances are introduced into a plasma generator. An inert gas, e.g., hydrogen or argon, may be introduced simultaneously with the film-forming substances. In this case, desirable mixed gases include a mixture of a hydrocarbon (e.g., methane), and argon.

Too large thicknesses of the hard carbonaceous protective film result in impaired electromagnetic characteristics and reduced adhesion to the magnetic layer, while too small thicknesses thereof result in insufficient abrasion resistance. Consequently, the thickness thereof is desirably from 30 to 200 Å (i.e., 3 to 20 nm), preferably from 50 to 100 Å (i.e., 5 to 10 nm).

For the purpose of further improving adhesion between the hard carbonaceous protective film and a lubricant to be applied thereto, the surface of the hard carbonaceous protective film may be treated with an oxidizing or inert gas.

In the magnetic recording medium of the present invention, lubricants and rust preventives are preferably applied to the magnetic layer or protective film in order to improve running durability and corrosion resistance.

A known hydrocarbon lubricant, fluorine-based lubricant, extreme-pressure additive, or the like may be used as the lubricant.

Examples of the hydrocarbon lubricant include carboxylic acids such as stearic acid and oleic acid, esters such as butyl stearate, sulfonic acids such as octadecylsulfonic acid, phosphoric acid esters such as monooctadecyl phosphate, alcohols such as stearyl alcohol and oleyl alcohol, carboxylic acid amides such as stearic acid amide, and amines such as stearylamine.

Examples of the fluorine-based lubricant include compounds formed from the above-enumerated hydrocarbon-based lubricants by partly or wholly substituting the alkyl group with a fluoroalkyl or perfluoropolyether group. Examples of the perfluoropolyether group include perfluoromethylene oxide polymers, perfluoroethylene oxide polymers, perfluoro-n-propylene oxide polymers $\{(CF_2CF_2CF_2O)_n\}$, perfluoroisopropylene oxide polymers $\{(CF(CF_3)CF_2O)_n\}$, and copolymers thereof.

Examples of the extreme-pressure additive include phosphoric acid esters such as trilauryl phosphate, phosphorous acid esters such as trilauryl phosphite, thiophosphorous acid esters such as trilauryl trithiophosphite, thiophosphoric acid esters, and other sulfur compounds such as dibenzyl disulfide.

The above-enumerated lubricants may be used alone or in combination of two or more thereof. For applying these lubricants to the magnetic layer or protective layer, a coating technique such as wire-bar coating, gravure coating, spin coating, or dip coating may be used, in which the magnetic or protective layer is coated with a lubricant dissolved in an organic solvent. Alternatively, vapor deposition may be used to deposit the lubricants on the magnetic or protective layer.

The application amount of the lubricants is desirably from 1 to 30 mg/m$^2$, particularly preferably from 2 to 20 mg/m$^2$.

Examples of rust preventives usable in the present invention include nitrogen-containing heterocyclic compounds such as benzotriazole, benzimidazole, purine, and pyrimidine; derivatives thereof formed by incorporating one or more alkyl side chains into the framework of these heterocyclic compounds; nitrogen and sulfur-containing heterocyclic compounds such as benzothiazole, 2-mercaptobenzothiazole, tetrazaindene ring compounds, and thiouracil compounds; and derivatives of these nitrogen and sulfur-containing heterocyclic compounds.

Specific examples of the tetrazaindene ring compounds usable for that purpose include the compounds represented by the following formula.

In the above formula, R is a hydrocarbon group selected from an alkyl group, an alkoxy group, and an alkylamide group.

The hydrocarbon group represented by R preferably has from 3 to 20 carbon atoms. Specific examples thereof include alkoxy groups represented by ROCOCH$_2$— wherein R is C$_3$H$_7$—, C$_6$H$_{13}$—, or phenyl, alkyl groups such as C$_6$H$_{13}$—, C$_9$H$_{19}$—, and C$_{17}$H$_{35}$—, and alkylamide groups represented by RNHCOCH$_2$— wherein R is phenyl or C$_3$H$_7$—.

Specific examples of the thiouracil ring compounds include the compounds represented by the following formula.

The present invention will be explained below in more detail by reference to Examples and Comparative Examples, but the invention should not be construed as being limited thereto.

EXAMPLE I-1

A solution containing spherical silica particles with an average particle diameter of 30 nm and having Composition I-1 shown below was applied to a 10 μm-thick poly(ethylene terephthalate) film with a wire bar method having a wire diameter of 0.04 mm to fix the heat-resistant fine particles to the film surface. Thereto was then applied a solution having Composition I-2 shown below at a thickness of 20 nm on a dry basis to form an undercoating layer. This undercoating layer had projections having a height of about 10 nm and attributable to the heat-resistant fine silica particles, at a density of 3.5×10 projections per mm$^2$. The undercoating layer also had projections having a height of 30 nm or larger at a density of 5×10 projections per mm$^2$.

| Composition I-1 | |
|---|---|
| Silica fine particles (30 nm) | 0.06 wt % |
| Tetraethoxysilane | 0.54 wt % |
| Methyltriethoxysilane | 0.46 wt % |
| 1-M Hydrochloric acid | 0.11 wt % |
| Water | 0.26 wt % |
| Cyclohexanone | 98.57 wt % |
| Composition I-2 | |
| Tetraethoxysilane | 4.85 wt % |
| Methyltriethoxysilane | 4.15 wt % |
| 1-M Hydrochloric acid | 0.99 wt % |
| Water | 2.36 wt % |
| Cyclohexanone | 87.65 wt % |

Cobalt was then deposited twice on the undercoated nonmagnetic support in an oxygen-containing atmosphere at a thickness of 70 nm by the oblique-incidence vapor deposition process, during which the support continuously travelled while in contact with a rotating can cooled to 0° C. and a vapor stream of the magnetic metal was kept being introduced at an angle of incidence of 45° to the poly (ethylene terephthalate) film. Thus, a two-layered ferromagnetic-metal film having a total thickness of 140 nm was formed, in which the columnar crystals of the ferromagnetic metal constituting the two thin layers were inclined in the same direction. On this magnetic layer was then formed a carbonaceous protective layer by the plasma (-assisted) CVD process as follows.

Methane was fed as a raw material at a flow rate of 150 sccm, and argon was fed as a carrier at a flow rate of 50 sccm. A high-frequency power of 600 W was applied, and the plasma generated was accelerated by applying a direct current voltage of −400 V to the magnetic-layer surface through a pass roller and applying a direct current voltage of +500 V to an anode disposed at a gas inlet. Thus, a hard carbonaceous protective layer consisting of diamond-like carbon was formed on the surface of the magnetic layer which had a travelling speed of 5 m/min and a temperature of 20° C.

The carbonaceous protective layer thus obtained had a thickness of 8 nm, and was ascertained by Raman spectrometry to be made up of diamond-like carbon. A protective layer separately formed by the same method had a Vickers hardness of 2,200 kg/mm$^2$. The protective-layer surface had 30 nm or higher projections at a density of 0.05 projections per $\mu m^2$.

A back coat comprising carbon black and a binder resin was formed on the back of the base film with a wire bar.

Subsequently, a solution prepared by dissolving a perfluoropolyether lubricant having a carboxyl group at each end ("FOMBLIN Z-DIAC", manufactured by Montefluos Co.) in a fluorine compound solvent ("ZS-100", manufactured by the same company) was applied to the carbonaceous protective layer with a wire bar at a spread rate of 10 mg/m$^2$, and then dried.

This web was slit into a width of 8 mm, and set into a cassette for an 8-mm VTR to give a sample.

The sample thus obtained was evaluated for the properties shown below.

(1) State of Surface Projections

The state of surface projections was examined with an interatomic-force microscope after the formation of the undercoating layer and after the formation of both the magnetic layer and the protective layer. Thus, the density of projections having a height of 30 nm or larger as measured from the reference plane was determined.

(2) Electromagnetic Characteristics

Using a VTR produced by modifying EV-S900 (manufactured by SONY Corp.), signals having a single frequency of 7 MHz were recorded and reproduced to measure the reproduced output and noise and to calculate C/N.

(3) Coefficient of Friction with Stainless Steel

Coefficient of friction was determined as follows to evaluate running properties. The magnetic recording medium was brought into contact with a stainless-steel pole (material, SUS 420J) at a tension ($T_1$) of 20 g and a winding angle of 180° under conditions of 23° C. and 70% RH. This magnetic tape was run at a speed of 3.3 cm/sec to measure the tension ($T_2$) required for the running. The coefficient of friction, $\mu$, of the magnetic tape was determined using the following equation.

$$\mu = (1/\pi) \cdot ln(T_2/T_1)$$

(4) Breaking Load of Magnetic Layer

A 100-mm portion of the tape was fixed, and the fixed portion was gradually stretched while the surface thereof was examined with an optical microscope. The load at which cracking occurred was taken as the breaking load (g).

EXAMPLE I-2

A magnetic recording medium was produced in the same manner as in Example I-1, except that a solution having Composition I-3 shown below was applied in place of the solution having Composition I-2 to form an undercoating layer having a thickness of 30 nm.

| Composition I-3 | |
| --- | --- |
| Tetraethoxysilane | 7.54 wt % |
| Methyltriethoxysilane | 6.46 wt % |
| 1-M Hydrochloric acid | 1.54 wt % |
| Water | 3.67 wt % |
| Cyclohexanone | 80.79 wt % |

EXAMPLE I-3

A magnetic recording medium was produced in the same manner as in Example I-1, except that a solution having Composition I-4 shown below was applied in place of the solution having Composition I-2 to form an undercoating layer having a thickness of 10 nm.

| Composition I-4 | |
| --- | --- |
| Tetraethoxysilane | 2.16 wt % |
| Methyltriethoxysilane | 1.84 wt % |
| 1-M Hydrochloric acid | 0.44 wt % |
| Water | 1.05 wt % |
| Cyclohexanone | 94.51 wt % |

EXAMPLE I-4

A magnetic recording medium was produced in the same manner as in Example I-1, except that a solution having Composition I-5 shown below was applied after application of the solution having Composition I-1 to form an undercoating layer having a thickness of 40 nm.

| Composition I-5 | |
| --- | --- |
| Tetraethoxysilane | 10.23 wt % |
| Methyltriethoxysilane | 8.76 wt % |
| 1-M Hydrochloric acid | 2.09 wt % |
| Water | 4.98 wt % |
| Cyclohexanone | 73.94 wt % |

EXAMPLE I-5

A magnetic recording medium was produced in the same manner as in Example I-1, except that a solution containing silica particles with an average particle diameter of 50 nm and having Composition I-6 shown below was used in place of the solution having Composition I-1, and that Composition I-5 shown below was used in place of Composition I-2 to form an undercoating layer having a thickness of 40 nm.

| Composition I-6 | |
|---|---|
| Silica fine particles (30 nm) | 0.06 wt % |
| Tetraethoxysilane | 0.54 wt % |
| Methyltriethoxysilane | 0.46 wt % |
| 1-M Hydrochloric acid | 0.11 wt % |
| Water | 0.26 wt % |
| Cyclohexanone | 98.57 wt % |

EXAMPLE I-6

A magnetic recording medium was produced in the same manner as in Example I-1, except that Composition I-7 shown below, which contained silica particles with an average particle diameter of 12 nm, was used in place of Composition I-1 to form an undercoating layer having a thickness of 2 nm without using the solution having Composition I-2.

| Composition I-7 | |
|---|---|
| Silica fine particles (12 nm) | 0.03 wt % |
| Tetraethoxysilane | 0.54 wt % |
| Methyltriethoxysilane | 0.46 wt % |
| 1-M Hydrochloric acid | 0.11 wt % |
| Water | 0.26 wt % |
| Cyclohexanone | 98.57 wt % |

EXAMPLE I-7

A magnetic recording medium was produced in the same manner as in Example I-1, except that a solution containing silica particles with an average particle diameter of 30 nm and having Composition I-10 shown below was used in place of the solution having Composition I-1, and that a solution having Composition I-11 shown below was used in place of the solution having Composition I-2 to form an undercoating layer having a thickness of 20 nm.

| Composition I-10 | |
|---|---|
| Silica fine particles (30 nm) | 0.06 wt % |
| Tetraethoxysilane | 0.86 wt % |
| Methyltriethoxysilane | 0.18 wt % |
| 1-M Hydrochloric acid | 0.11 wt % |
| Water | 0.26 wt % |
| Cyclohexanone | 98.53 wt % |
| Composition I-11 | |
| Tetraethoxysilane | 7.76 wt % |
| Methyltriethoxysilane | 1.66 wt % |
| 1-M Hydrochloric acid | 0.99 wt % |
| Water | 2.36 wt % |
| Cyclohexanone | 87.23 wt % |

EXAMPLE I-8

A magnetic recording medium was produced in the same manner as in Example I-1, except that a solution containing silica particles with an average particle diameter of 30 nm and having Composition I-12 shown below was used in place of the solution having Composition I-1, and that a solution having Composition I-13 shown below was used in place of the solution having Composition I-2 to form an undercoating layer having a thickness of 20 nm.

| Composition I-12 | |
|---|---|
| Silica fine particles (30 nm) | 0.06 wt % |
| Tetraethoxysilane | 0.22 wt % |
| Methyltriethoxysilane | 0.74 wt % |
| 1-M Hydrochloric acid | 0.11 wt % |
| Water | 0.26 wt % |
| Cyclohexanone | 98.61 wt % |
| Composition I-13 | |
| Tetraethoxysilane | 1.94 wt % |
| Methyltriethoxysilane | 6.64 wt % |
| 1-M Hydrochloric acid | 0.99 wt % |
| Water | 2.36 wt % |
| Cyclohexanone | 88.07 wt % |

EXAMPLE I-9

A magnetic recording medium was produced in the same manner as in Example I-1, except that a solution containing silica particles with an average particle diameter of 30 nm and having Composition I-16 shown below was used in place of the solution having Composition I-1, and that a solution having Composition I-15 shown below was used in place of the solution having Composition I-2 to form an undercoating layer having a thickness of 20 nm.

| Composition I-14 | |
|---|---|
| Silica fine particles (30 nm) | 0.06 wt % |
| Tetraethoxysilane | 0.54 wt % |
| Ethyltriethoxysilane | 0.50 wt % |
| 1-M Hydrochloric acid | 0.11 wt % |
| Water | 0.26 wt % |
| Cyclohexanone | 98.53 wt % |
| Composition I-15 | |
| Tetraethoxysilane | 4.85 wt % |
| Ethyltriethoxysilane | 4.48 wt % |
| 1-M Hydrochloric acid | 0.99 wt % |
| Water | 2.36 wt % |
| Cyclohexanone | 87.32 wt % |

EXAMPLE I-10

A magnetic recording medium was produced in the same manner as in Example I-1, except that a solution containing silica particles with an average particle diameter of 30 nm and having Composition I-16 shown below was used in place of the solution having Composition I-1, and that a solution having Composition I-17 shown below was used in place of the solution having Composition I-2 to form an undercoating layer having a thickness of 20 nm.

| Composition I-16 | |
|---|---|
| Silica fine particles (30 nm) | 0.06 wt % |
| Tetraethoxysilane | 0.54 wt % |
| Diinethyldiethoxysilane | 0.32 wt % |
| 1-M Hydrochloric acid | 0.11 wt % |

-continued

| | |
|---|---|
| Water | 0.26 wt % |
| Cyclohexanone | 98.71 wt % |

Composition I-17

| | |
|---|---|
| Tetraethoxysilane | 4.85 wt % |
| Methyltriethoxysilane | 2.89 wt % |
| 1-M Hydrochloric acid | 0.99 wt % |
| Water | 2.36 wt % |
| Cyclohexanone | 88.91 wt % |

Composition I-19

| | |
|---|---|
| Silica fine particles (12 nm) | 0.06 wt % |
| Polyester resin | 0.20 wt % |
| Cyclohexanone | 99.74 wt % |

COMPARATIVE EXAMPLE I-1

For the purpose of comparison with the present invention, a magnetic recording medium was produced in the same The samples obtained above were evaluated, and the results are shown in Table I-1.

TABLE I-1

| | Average particle diameter of silica (nm) | Thickness of undercoating layer (nm) | Alkoxysilane* | Number of 30-nm or larger projections ($\times 10^3/mm^2$) Undercoating layer | Protective layer | Output (dB) | C/N (dB) | Coefficient of fraction | Breaking load (g) |
|---|---|---|---|---|---|---|---|---|---|
| Example I-1 | 30 | 20 | T(50) + M(50) | 5 | 5 | 2.1 | 2 | 0.33 | 250 |
| Example I-2 | 30 | 30 | T(50) + M(50) | 0 | 0 | 1.7 | 1.9 | 0.53 | 255 |
| Example I-3 | 30 | 10 | T(50) + M(50) | 65 | 78 | 0.3 | 0.4 | 0.28 | 270 |
| Example I-4 | 30 | 40 | T(50) + M(50) | 3 | 3 | 1.9 | 1.8 | 0.32 | 260 |
| Example I-5 | 50 | 40 | T(50) + M(50) | 8 | 8 | 1.5 | 1.2 | 0.32 | 235 |
| Example I-6 | 12 | 2 | T(50) + M(50) | 3 | 5 | 1.5 | 1.3 | 0.32 | 240 |
| Example I-7 | 30 | 20 | T(80) + M(20) | 7 | 9 | 1.9 | 1.4 | 0.33 | 220 |
| Example I-8 | 30 | 20 | T(20) + M(80) | 12 | 22 | 0.8 | 0.7 | 0.32 | 260 |
| Example I-9 | 30 | 20 | T(50) + E(50) | 8 | 7 | 1.5 | 1.6 | 0.33 | 255 |
| Example I-10 | 30 | 20 | T(50) + D(50) | 21 | 33 | 0.9 | 0.3 | 0.28 | 270 |
| Comparative Example I-1 | 30 | 20 | polyester resin | 6 | 55 | −2.5 | −2.9 | 0.28 | 210 |
| Comparative Example I-2 | 12 | 2 | polyester resin | 32 | 49 | 0 | 0 | 0.27 | 210 |

(*) T: tetraethoxysilane M: methyltriethoxysilane E: ethyltriethoxysilane D: dimethylethoxysilane
The numeral in each ( ) is given in mol. %.

manner as in Example I-1, except that a solution containing silica particles with an average particle diameter of 30 nm and a polyester resin ("Vylon #200", manufactured by Toyobo Co., Ltd., Japan) and having Composition I-18 shown below was used as an undercoating solution to form an undercoating layer having a thickness of 20 nm.

| Composition I-18 | |
|---|---|
| Silica fine particles (30 nm) | 0.06 wt % |
| Polyester resin | 2.00 wt % |
| Cyclohexanone | 97.94 wt % |

COMPARATIVE EXAMPLE I-2

For the purpose of comparison with the present invention, a magnetic recording medium was produced in the same manner as in Example I-1, except that a solution containing silica particles with an average particle diameter of 12 nm and a polyester resin ("Vylon #200", manufactured by Toyobo Co., Ltd.) and having Composition I-19 shown below was used as an undercoating solution to form an undercoating layer having a thickness of 2 nm.

As is apparent from the results of the examples given above, the magnetic recording tapes according to the present invention were capable of having evenly low projections and had suffered no surface deterioration caused by, e.g., thermal damage even though they had been produced through vapor deposition. Consequently, high electromagnetic characteristics can be obtained by the present invention.

For the purpose of examining the stability of the undercoating layer according to the invention to sputtering, magnetic disks were produced through sputtering under the following conditions.

EXAMPLE I-11

An undercoating layer was formed on a 50 μm-thick polyimide film in the same manner as in Example I-1. This undercoated support was set in a sputtering apparatus. The substrate was heated to 200° C., and the vacuum chamber was evacuated to $8\times10^{-7}$ Torr. Argon gas was then introduced to adjust the internal pressure to $3\times10^{-5}$ Torr. Subsequently, a 150-nm film of Cr (nonmagnetic primer coating layer) and a 30-mm film of $Co_{74}Pt_{21}Cr_5$ alloy (magnetic layer) were formed in this order on the undercoating layer by the DC magnetron sputtering method. The sheet was then taken out of the vacuum chamber, and coated with a hard carbonaceous protective layer and a lubricant layer in the same manner as in Example I-1. A 3.5-inch disk was punched therefrom to give a sample.

COMPARATIVE EXAMPLE I-3

A magnetic disk was produced in the same manner as in Example I-11, except that the undercoating layer in Example I-11 was replaced with the polyester resin undercoating layer used in Comparative Example I-1.

With respect to each of the samples obtained in Example I-11 and Comparative Example I-3, the undercoating layer surface and the protective-layer surface were examined with an interatomic microscope in the same manner as in Examples I-1 to I-10 to determine the density of projections having a height of 30 nm or larger. Thus, a change in surface properties was examined. The results obtained are shown in Table I-2.

TABLE I-2

| | Density of 30 nm or higher projections (projections per mm$^2$) | |
|---|---|---|
| | Undercoating layer | Protective layer |
| Example I-11 | $6 \times 10^3$ | $7 \times 10^3$ |
| Comparative Example I-3 | $8 \times 10^3$ | $92 \times 10^3$ |

EXAMPLE II-1

A solution containing spherical silica particles with an average particle diameter of 30 nm and having Composition II-1 shown below was applied to a 10 μm-thick poly (ethylene terephthalate) film with a wire bar to fix the heat-resistant fine particles to the film surface. Thereto was then applied a solution having Composition II-2 shown below at a thickness of 20 nm on a dry basis to form an undercoating layer comprising titania. This undercoating layer had projections having a height of about 10 nm and attributable to the heat-resistant silica fine particles, at a density of $3 \times 10^6$ projections per mm$^2$. The undercoating layer also had projections having a height of 30 nm or larger at a density of $3 \times 10^3$ projections per mm.

| Composition II-1 | |
|---|---|
| Silica fine particles (30 nm) | 0.06 wt % |
| Tetra-n-butoxytitanium | 0.96 wt % |
| Acetylacetone | 0.28 wt % |
| Water | 0.10 wt % |
| Ethyl alcohol | 98.60 wt % |
| Composition II-2 | |
| Tetra-n-butoxytitanium | 8.64 wt % |
| Acetylacetone | 2.53 wt % |
| Water | 0.91 wt % |
| Ethyl alcohol | 87.92 wt % |

Cobalt was then deposited twice on the undercoated nonmagnetic support in an oxygen-containing atmosphere at a thickness of 70 nm by the oblique-incidence vapor deposition process, during which the support continuously travelled while in contact with a rotating can cooled to 0° C. and a vapor stream of the magnetic metal was kept being introduced at an angle of incidence of 45° with the poly (ethylene terephthalate) film. Thus, a two-layered ferromagnetic-metal film having a total thickness of 140 nm was formed, in which the columnar crystals of the ferromagnetic metal constituting the two thin layers were inclined in the same direction. On this magnetic layer was then formed a carbonaceous protective layer by the plasma CVD process as follows.

Methane was fed as a raw material at a flow rate of 150 sccm, and argon was fed as a carrier at a flow rate of 50 sccm. A high-frequency power of 600 W was applied, and the plasma generated was accelerated by applying a direct current voltage of −400 V to the magnetic-layer surface through a pass roller and applying a direct current voltage of +500 V to an anode disposed at a gas inlet. Thus, a hard carbonaceous protective layer consisting of diamond-like carbon was formed on the surface of the magnetic layer which had a travelling speed of 5 m/min and a temperature of 20° C.

The carbonaceous protective layer thus obtained had a thickness of 8 nm, and was ascertained by Raman spectrometry to be made up of diamond-like carbon. A protective layer separately formed by the same method had a Vickers hardness of 2,200 kg/mm. The protective-layer surface had 30-nm or higher projections at a density of $3 \times 10^3$ projections per mm$^2$.

A back coat comprising carbon black and a binder resin was formed on the back of the base film with a wire bar.

Subsequently, a solution prepared by dissolving a perfluoropolyether lubricant having a carboxyl group at each end ("FOMBLIN Z-DIAC", manufactured by Montefluos Co.) in a fluorine compound solvent ("ZS-100", manufactured by the same company) was applied to the carbonaceous protective layer with a wire bar at a spread rate of 10 mg/m$^2$, and then dried.

This web was slit into a width of 8 mm, and set into a cassette for an 8-mm VTR to give a sample.

The sample thus obtained was evaluated for the state of surface projections, electromagnetic characteristics, the coefficient of friction with stainless steel, and the breaking load of the magnetic layer in the same manner as in Example I-1.

EXAMPLE II-2

A solution containing spherical silica particles with an average particle diameter of 30 nm and having Composition 3 shown below was applied to a 10 μm-thick poly(ethylene terephthalate) film with a wire bar to fix the heat-resistant fine particles to the film surface. Thereto was then applied a solution having Composition II-4 shown below at a thickness of 20 nm on a dry basis to form an undercoating layer comprising alumina. The subsequent procedure was carried out in the same manner as in Example II-1 to produce a sample.

| Composition II-3 | |
|---|---|
| Silica fine particles (30 nm) | 0.06 wt % |
| Tetra-n-butoxyaluminum | 0.69 wt % |
| Monoethanolamine | 0.26 wt % |
| Water | 0.10 wt % |
| Ethyl alcohol | 98.89 wt % |
| Composition II-4 | |
| Tetra-n-butoxyalmninum | 6.24 wt % |
| Monoethanolamine | 2.32 wt % |
| Water | 0.91 wt % |
| Ethyl alcohol | 90.53 wt % |

EXAMPLE II-3

A solution containing spherical silica particles with an average particle diameter of 30 nm and having Composition II-5 shown below was applied to a 10 μm-thick poly(ethylene terephthalate) film with a wire bar to fix the heat-resistant fine particles to the film surface. Thereto was then applied a solution having Composition II-6 shown below at a thickness of 20 nm on a dry basis to form an undercoating layer comprising zirconia. The subsequent procedure was carried out in the same manner as in Example II-1 to produce a sample.

| Composition II-5 | |
|---|---|
| Silica fine particles (30 nm) | 0.06 wt % |
| Tetra-n-propoxyzirconium | 0.92 wt % |
| Acetylacetone | 0.28 wt % |
| Water | 0.10 wt % |
| Ethyl alcohol | 98.60 wt % |
| Composition II-6 | |
| Tetra-n-propoxyzirconium | 8.29 wt % |
| Acetylacetone | 2.53 wt % |
| Water | 0.91 wt % |
| Ethyl alcohol | 87.92 wt % |

EXAMPLE II-4

A solution containing spherical silica particles with an average particle diameter of 30 nm and having Composition II-7 shown below was applied to a 10 μm-thick poly(ethylene terephthalate) film with a wire bar to fix the heat-resistant fine particles to the film surface. Thereto was then applied a solution having Composition II-8 shown below at a thickness of 30 nm on a dry basis to form an undercoating layer comprising titania. The subsequent procedure was carried out in the same manner as in Example II-1 to produce a sample.

| Composition II-7 | |
|---|---|
| Silica fine particles (30 nm) | 0.06 wt % |
| Tetra-n-butoxytitanium | 0.96 wt % |
| Acetylacetone | 0.28 wt % |
| Water | 0.10 wt % |
| Ethyl alcohol | 98.60 wt % |
| Composition II-8 | |
| Tetra-n-butoxytitanium | 13.60 wt % |
| Acetylacetone | 3.99 wt % |
| Water | 1.45 wt % |
| Ethyl alcohol | 80.96 wt % |

EXAMPLE II-5

A solution containing spherical silica particles with an average particle diameter of 30 nm and having Composition II-9 shown below was applied to a 10 μm-thick poly(ethylene terephthalate) film with a wire bar to fix the heat-resistant fine particles to the film surface. Thereto was then applied a solution having Composition II-10 shown below at a thickness of 10 nm on a dry basis to form an undercoating layer comprising titania. The subsequent procedure was carried out in the same manner as in Example II-1 to produce a sample.

| Composition II-9 | |
|---|---|
| Silica fine particles (30 nm) | 0.06 wt % |
| Tetra-n-butoxytitanium | 0.96 wt % |
| Acetylacetone | 0.28 wt % |
| Water | 0.10 wt % |
| Ethyl alcohol | 98.60 wt % |
| Composition II-10 | |
| Tetra-n-butoxytitanium | 4.55 wt % |
| Acetylacetone | 1.33 wt % |
| Water | 0.48 wt % |
| Ethyl alcohol | 93.64 wt % |

EXAMPLE II-6

A solution containing spherical silica particles with an average particle diameter of 20 nm and having Composition II-11 shown below was applied to a 10 μm-thick poly(ethylene terephthalate) film with a wire bar to fix the heat-resistant fine particles to the film surface. Thereto was then applied a solution having Composition II-12 shown below at a thickness of 15 nm on a dry basis to form an undercoating layer comprising titania. The subsequent procedure was carried out in the same manner as in Example II-1 to produce a sample.

| Composition II-11 | |
|---|---|
| Silica fine particles (20 nm) | 0.05 wt % |
| Tetra-n-butoxytitanium | 0.96 wt % |
| Acetylacetone | 0.28 wt % |
| Water | 0.10 wt % |
| Ethyl alcohol | 98.67 wt % |
| Composition II-12 | |
| Tetra-n-butoxytitanium | 6.37 wt % |
| Acetylacetone | 1.86 wt % |
| Water | 0.67 wt % |
| Ethyl alcohol | 91.10 wt % |

EXAMPLE II-7

A solution containing spherical silica particles with an average particle diameter of 12 nm and having Composition II-13 shown below was applied to a 10 μm-thick poly(ethylene terephthalate) film with a wire bar at a thickness of 2 nm on a dry basis to form an undercoating layer comprising titania. The subsequent procedure was carried out in the same manner as in Example II-1 to produce a sample.

| Composition II-13 | |
|---|---|
| Silica fine particles (12 nm) | 0.03 wt % |
| Tetra-n-butoxytitanium | 0.96 wt % |
| Acetylacetone | 0.28 wt % |
| Water | 0.10 wt % |
| Ethyl alcohol | 98.63 wt % |

COMPARATIVE EXAMPLE II-1

For the purpose of comparison with the present invention, a magnetic recording medium was produced in the same manner as in Example II-1, except that a solution containing silica particles with an average particle diameter of 30 nm and a polyester resin ("Vylon #200", manufactured by Toyobo Co., Ltd.) and having Composition II-14 shown below was used as an undercoating solution to form an undercoating layer having a thickness of 20 nm.

| Composition II-14 | |
|---|---|
| Silica fine particles (30 nm) | 0.06 wt % |
| Polyester resin | 2.00 wt % |
| Cyclohexanone | 97.94 wt % |

COMPARATIVE EXAMPLE II-2

For the purpose of comparison with the present invention, a magnetic recording medium was produced in the same manner as in Example II-1, except that a solution containing silica particles with an average particle diameter of 12 nm and a polyester resin ("Vylon #200", manufactured by Toyobo Co., Ltd.) and having Composition II-15 shown below was used as an undercoating solution to form an undercoating layer having a thickness of 2 nm.

| Composition II-15 | |
|---|---|
| Silica fine particles (12 nm) | 0.03 wt % |
| Polyester resin | 0.20 wt % |
| Cyclohexanone | 99.77 wt % |

The samples obtained above were evaluated, and the results obtained are shown in Table II-1.

undercoated support was set in a sputtering apparatus. The substrate was heated to 200° C., and the vacuum chamber was evacuated to $8\times10^{-7}$ Torr. Argon gas was then introduced to adjust the internal pressure to $3\times10^{-5}$ Torr. Subsequently, a 150-nm film of Cr (nonmagnetic primer coating layer) and a 30-mm film of $Co_{74}Pt_{21}Cr_5$ alloy (magnetic layer) were formed in this order on the undercoating layer by the DC magnetron sputtering method. The sheet was then taken out of the vacuum chamber, and coated with a hard carbonaceous protective layer and a lubricant layer in the same manner as in Example II-1. A 3.5-inch disk was punched therefrom to give a sample.

COMPARATIVE EXAMPLE II-3

A magnetic disk was produced in the same manner as in Example II-8, except that the undercoating layer in Example II-8 was replaced with the polyester resin undercoating layer used in Comparative Example II-1.

With respect to each of the samples obtained in Example II-8 and Comparative Example II-3, the undercoating layer surface and the protective-layer surface were examined with an interatomic microscope in the same manner as in Examples II-1 to II-7 to determine the density of projections having a height of 30 nm or larger. Thus, a change in surface properties was examined. The results obtained are shown in Table II-2.

TABLE II-1

| | Average particle diameter of silica (nm) | Thickness of undercoating layer (nm) | Material of undercoating layer | Number of 30-nm or larger projections ($\times10^3/mm^2$) | | Output (dB) | C/N (dB) | Coefficient of fraction | Breaking load (g) |
|---|---|---|---|---|---|---|---|---|---|
| | | | | Undercoating layer | Protective layer | | | | |
| Example II-1 | 30 | 20 | titania | 3 | 3 | 2.3 | 1.9 | 0.33 | 240 |
| Example II-2 | 30 | 20 | alumina | 11 | 15 | 1.3 | 1 | 0.3 | 240 |
| Example II-3 | 30 | 20 | zirconia | 8 | 8 | 1.8 | 1.5 | 0.31 | 230 |
| Example II-4 | 30 | 30 | titania | 0 | 0 | 2.2 | 2.2 | 0.43 | 255 |
| Example II-5 | 30 | 10 | titania | 45 | 60 | 0.6 | 0.2 | 0.28 | 270 |
| Example II-6 | 20 | 15 | titania | 5 | 8 | 2.1 | 1.9 | 0.33 | 245 |
| Example II-7 | 12 | 2 | titania | 44 | 48 | 0.4 | 0.2 | 0.28 | 250 |
| Comparative Example II-1 | 30 | 20 | polyester resin | 6 | 55 | -2.5 | -2.9 | 0.28 | 210 |
| Comparative Example II-2 | 12 | 2 | polyester resin | 32 | 49 | 0 | 0 | 0.27 | 210 |

As is apparent from the results of the examples given above, the magnetic recording tapes according to the present invention were capable of having evenly low projections and had suffered no surface deterioration caused by, e.g., thermal damage even though they had been produced through vapor deposition. Consequently, high electromagnetic characteristics can be obtained by the present invention.

For the purpose of examining the stability of the undercoating layer according to the invention to sputtering, magnetic disks were produced through sputtering under the following conditions.

EXAMPLE II-8

An undercoating layer was formed on a 50 μm-thick polyimide film in the same manner as in Example II-1. This

TABLE II-2

| | Number of 30 nm or higher projections ($\times10^3$ projections per $mm^2$) | |
|---|---|---|
| | Undercoating layer | Protective layer |
| Example II-8 | 5 | 7 |
| Comparative Example II-3 | 8 | 92 |

The present invention produces the following effects. Since an undercoating layer comprising either a silica film or a metal oxide film and containing heat-resistant fine particles is formed between a nonmagnetic support and a magnetic layer, uniform projections attributable to the heat-resistant fine particles can be evenly formed on the surface of the nonmagnetic support. This undercoating layer never suffers thermal damage even when a primer coating layer (i.e., a subbing layer) or the magnetic layer is formed by sputtering. As a result, the magnetic layer obtained has extremely good surface properties and, hence, a magnetic recording medium having high electromagnetic characteristics can be obtained.

While the invention has been described in detail and with reference to specific embodiments thereof, it will be apparent to one skilled in the art that various changes and modifications can be made therein without departing from the spirit and scope thereof.

What is claimed is:

1. A process for producing a magnetic recording medium comprising a nonmagnetic support having a magnetic layer comprising a ferromagnetic metal thin film formed on at least one side surface of said nonmagnetic support, and an undercoating layer, said process comprising the steps of, in order:

coating as an undercoating layer on at least one side surface of said nonmagnetic support a coating solution comprising a silicon-containing compound or metal-containing compound dissolved in a solvent and heat-resistant fine particles;

drying said nonmagnetic support having said coating solution to hydrolyze and polymerize said silicon-containing compound or metal-containing compound to form a silica film comprising a network made up mainly of silicon-oxygen bonds or a metal oxide film comprising a network made up mainly of metal-oxygen bonds, containing said heat-resistant fine particles thereby obtaining said undercoating layer; and then forming a ferromagnetic metal thin film on said undercoating layer with a vacuum film-forming method.

2. The process for producing a magnetic recording medium as claimed in claim 1, wherein said heat-resistant fine particles have an average particle diameter ranging from 20 to 50 nm.

3. The process for producing a magnetic recording medium as claimed in claim 2, wherein said silicon compound is selected from the group consisting of tetraalkoxysilane, alkyltrialkoxysilane and mixtures thereof.

4. The process for producing a magnetic recording medium as claimed in claim 2, wherein said metal compound is selected from the group consisting of titania, alumina, zirconia and mixtures thereof.

5. The process for producing a magnetic recording medium as claimed in claim 2, wherein said heat resistant fine particles comprise particles selected from the group consisting of aromatic polyamide particles, polyimide particles, polysulfone particles, poly(phenylene oxide) particles, silica particles, alumina particles, titania particles and carbon particles.

6. The process for producing a magnetic recording medium as claimed in claim 2, wherein said heat resistant fine particles have an average particle diameter of from 15 to 100 nm.

7. The process for producing a magnetic recording medium as claimed in claim 2, wherein said silicon-containing compound is a combination of a tetraalkoxysilane and an alkylated alkoxysilane selected from a monoalkyltrialkoxysilane or dialkylclialkoxysilane in which the amount of said alkylated alkoxysilane ranges from 20 to 80 mol % based on the total amount of said tetraalkoxysilane and alkylated alkoxysilane.

8. The process for producing a magnetic recording medium as claimed in claim 7, wherein said alkylated alkoxysilane is selected from the group consisting of methyltriethoxysilane, ethyltriethoxysilanen-propyltriethoxysilane, dimethyldiethoxysilane and diethyldiethoxysilane.

9. The process for producing a magnetic recording medium as claimed in claim 7, wherein said tetraalkoxysilane is selected from the group consisting of tetramethoxysilane, tetraethoxysilane, tetra-n-propoxysilane, and tetraisopropoxysilane.

10. A process for producing a magnetic recording medium comprising a nonmagnetic support having a magnetic layer comprising a ferromagnetic metal thin film formed on at least one side surface of said nonmagnetic support and a two layered structured undercoating layer containing a first coating layer and a second coating layer from said support side, said process comprising the steps of, in order, coating as said first coating layer of said undercoating layer on at least one side surface of said nonmagnetic support a coating solution containing a silicon- or metal-containing compound dissolved in a solvent and heat-resistant fine particles;

drying said nonmagnetic support having said coating solution to hydrolyze and polymerize said silicon- or metal-containing compound to form a silica film comprising a network made up mainly of silicon-oxygen bonds or a metal oxide film comprising a network made up mainly of metal-oxygen bonds, containing said heat-resistant fine particles thereby obtaining said first coating layer;

coating on said first coating layer a coating solution containing a silicon-containing compound or metal-containing compound dissolved in a solvent free of heat-resistant fine particles hereby obtaining said second coating layer;

forming a ferromagnetic metal thin film on said undercoating layer with a vacuum film-forming method.

11. The process for producing a magnetic recording medium as claimed in claim 10, wherein said ferromagnetic metal thin film has a thickness ranging from 100 to 300 nm.

12. The process for producing a magnetic recording medium as claimed in claim 10, wherein said heat-resistant fine particles have an average particle diameter ranging from 15 to 100 nm.

13. The process for producing a magnetic recording medium as claimed in claim 10, wherein said heat-resistant fine particles have an average particle diameter ranging from 20 to 50 nm.

14. The process for producing a magnetic recording medium as claimed in claim 10, wherein the temperature of said drying ranges from 20 to 200° C.

15. The process for producing a magnetic recording medium as claimed in claim 10, wherein the temperature of said drying ranges from 50 to 150° C.

16. The process for producing a magnetic recording medium as claimed in claim 10, wherein said heat-resistant fine particles have an average particle diameter a ranging from 15 to 100 nm, and total thickness:d of said silica or metal oxide film is in the range such that a–d ranges from 0 to 20 nm.

17. The process for producing a magnetic recording medium as claimed in claim 10, wherein each of said silicon-containing compound for said first and second coating layers is at least one of tetraalkoxysilane and alkyltrialkoxysilane.

18. The process for producing a magnetic recording medium as claimed in claim 17, wherein each of said coating solutions for said first and second coating solutions contains an acid and water.

19. The process for producing a magnetic recording medium as claimed in claim 18, wherein the amount of said acid ranges from 0.1 to 20 mol % based on the amount of said silicon-containing compound.

20. The process for producing a magnetic recording medium as claimed in claim 18, wherein the amount of said water ranges from 100 to 800 mol % based on the amount of said silicon-containing compound.

21. The process for producing a magnetic recording medium as claimed in claim 10, wherein said silicon-containing compound is a combination of a tetraalkoxysilane and an alkylated alkoxysilane selected from a monoalkyltrialkoxysilane or dialkyldialkoxysilane, in which the amount of said alkylated alkoxysilane ranges from 20 to 80 mol % based on the total amount of said tetraalkoxysilane and alkylated alkoxysilane.

22. The process for producing a magnetic recording medium as claimed in claim 21, wherein said alkylated alkoxysilane is selected from the group consisting of methyltriethoxysilane, ethyltriethoxysilane, n-propyltriethoxysilane, dimethyldiethoxysilane and diethyldiethoxysilane.

23. The process for producing a magnetic recording medium as claimed in claim 21, wherein said tetraalkoxysilane is selected from the group consisting of tetramethoxysilane, tetraethoxysilane, tetrapropoxysilane, and tetraisopropoxysilane.

24. The process for producing a magnetic recording medium as claimed in claim 10, wherein each of said solvents present in said solution for said first and second coating layers is an organic solvent selected from the group consisting of methanol, ethanol, isopropanol, methyl ethyl ketone and cyclohexanone.

25. The process for producing a magnetic recording medium as claimed in claim 10, wherein said heat-resistant fine particles are inorganic particles selected from the group consisting of silica, alumina, titania and carbon.

26. The process for producing a magnetic recording medium as claimed in claim 10, wherein said nonmagnetic support comprises a polymer selected from the group consisting of poly(ethylene terephthalate), poly(ethylene naphthalate), a polyimide, a polyamide, a poly(amide-imide) and poly(phenylene sulfide).

27. The process for producing a magnetic recording medium as claimed in claim 10, wherein said ferromagnetic metal thin film comprises cobalt.

28. The process for producing a magnetic recording medium as claimed in claim 27, wherein said ferromagnetic metal thin film is Co—Cr, Co—Ni—Cr, Co—Cr—Ta, Co—Cr—Pt, Co—Cr—Ta—Pt, Co—Cr—Pt—Si or Co—Cr—Pt—B.

29. The process for producing a magnetic recording medium as claimed in claim 10, wherein each of said metal-containing compounds for said first and second coating layers is a metal alkoxide.

30. The process for producing a magnetic recording medium as claimed in claim 29, wherein each of said coating solutions for said first and second coating solution contains a stabilizer selected from the group consisting of a β-diketone, a alkanolamine and a thiol.

31. The process for producing a magnetic recording medium as claimed in claim 29, wherein said metal alkoxide is selected from the group consisting of tetra-n-butoxytitanium, tetra-n-butoxyaluminum or tetra-n-propoxyzirconium.

* * * * *